(12) United States Patent
Wang

(10) Patent No.: US 9,189,152 B2
(45) Date of Patent: Nov. 17, 2015

(54) TOUCH DEVICE AND METHOD FOR DYNAMICALLY SETTING TOUCH INACTIVE AREA, AND NON-TRANSITORY RECORDING MEDIUM

(71) Applicant: INSTITUTE FOR INFORMATION INDUSTRY, Taipei (TW)

(72) Inventor: Szu-Hsuan Wang, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 53 days.

(21) Appl. No.: 14/094,016

(22) Filed: Dec. 2, 2013

(65) Prior Publication Data
US 2015/0084877 A1 Mar. 26, 2015

(30) Foreign Application Priority Data
Sep. 26, 2013 (TW) .............................. 102134826 A

(51) Int. Cl.
*G06F 3/0488* (2013.01)
*G06F 3/041* (2006.01)
(52) U.S. Cl.
CPC .......... *G06F 3/04883* (2013.01); *G06F 3/0416* (2013.01); *G06F 3/04886* (2013.01)
(58) Field of Classification Search
CPC combination set(s) only.
See application file for complete search history.

(56) References Cited

U.S. PATENT DOCUMENTS

| 8,390,597 | B2 | 3/2013 | Bernstein |
| 8,432,368 | B2 | 4/2013 | Momeyer et al. |
| 2006/0097991 | A1* | 5/2006 | Hotelling et al. ............. 345/173 |
| 2006/0197753 | A1* | 9/2006 | Hotelling ...................... 345/173 |
| 2008/0093130 | A1* | 4/2008 | Lee et al. ................... 178/18.01 |

FOREIGN PATENT DOCUMENTS

TW I366130 6/2012

* cited by examiner

*Primary Examiner* — Van Chow
(74) *Attorney, Agent, or Firm* — Muncy, Geissler, Olds & Lowe, P.C.

(57) ABSTRACT

A touch device for dynamically setting a touch inactive area includes a storage unit, an identification unit, a touchscreen unit and a processing unit. The touchscreen unit presents an operation interface and a plurality of function keys provided thereby, each function key corresponding to a display area and a function. The identification unit generates feature data on the basis of a specific user. The processing unit obtains inactive area setting data by user data stored in the storage unit which corresponding to the feature data to set at least one touch inactive area on the touchscreen unit. However, when a function key corresponding to a display area overlapped with the touch inactive area is touched on the touchscreen unit, a corresponding function will not be activated.

20 Claims, 13 Drawing Sheets

TOUCH DEVICE AND METHOD FOR DYNAMICALLY SETTING TOUCH INACTIVE AREA, AND NON-TRANSITORY RECORDING MEDIUM

CROSS-REFERENCE TO RELATED APPLICATION

This application claims the benefit of Taiwan Patent Application No. 102134826, filed on Sep. 26, 2013, which is hereby incorporated by reference for all purposes as if fully set forth herein.

BACKGROUND

1. Field of the Invention

The present invention relates to a touch device and method for setting a touch area, and more particularly to a touch device and method for identifying users to set a dynamically touch inactive area corresponding to a touch inactive area, and a non-transitory recording medium.

2. Related Art

In the prior art, a touch device and an operation interface provided by its operating system are mostly presented by a touch screen. Users utilize the touch screen to send a control instruction in manners such as clicking, touching, and writing on the operation interface, to operate the touch device for executing program, inputting/outputting data, data frame presentation, connecting to network connection, and so on.

As shown in FIG. 1, since users have different habits and gestures for holding a touch device 100, an operation interface 110 with a fixed format may not be applicable to each user. Moreover, when holding the touch device 100, some users may touch the operation interface 110 with their fingers or other parts habitually to start an execution program, a function or a touch event that the user currently does not intend to execute. It results in a waste of working time and system resources. A more serious circumstance is that, when the touch device 100 is connected with a remote servo device, an unwanted touch event may cause the touch device to transmit mistaken data to the servo device, and the servo device may easily store the mistaken data after obtaining it, or further generate or start a mistaken operating mechanism, resulting in loss of property or reputation that the unit of the device cannot predict or is difficult to recover, or need of additional costs to correct the data and redress the loss caused by the mistaken data. With respect to the situation that unwanted touch easily occurs, there are no proper solutions currently, and generally the only way is to avoid portions most unwanted touch occurs on the operation interface design. However, since each user has a different habit of using the touch device and a different manner of holding it, positions where unwanted touch easily occurs vary and situations resulting in operation errors cannot be generalized; besides, display areas of many touch devices (e.g., mobile phones and tablet PCs) are quite small, so that the design of the operation interface of the device cannot coordinate with the habits of most users to avoid using all display areas where unwanted touch may occur. Hence, it is currently in need of a solution to prevent each user from generating unwanted touch or operation errors on the touch device.

SUMMARY

Accordingly, to solve the above mentioned problem, the present invention provides a touch device and method which dynamically set a touch inactive area and are applicable to operation habits of different users, and a non-transitory recording medium.

The touch device according to the present invention includes a storage unit, an identification unit, a touchscreen unit and a processing unit. The storage unit is used for storing a plurality of user data, each of the user data corresponding to one of inactive area setting data. The touchscreen unit is used for presenting an operation interface which provides a plurality of function keys, each function key corresponding to a display area and a function. The identification unit is used for generating feature data on the basis of a specific user. The processing unit is used for comparing the feature data with the related user data, to obtain the inactive area setting data corresponding to the feature data, so as to set at least one touch inactive area on the touchscreen unit. When a function key corresponding to a display area overlapped with the touch inactive area is touched on the touchscreen unit, a corresponding function will not be activated.

The method for dynamically setting an inactive area according to the present invention is applicable to a touch device. The touch device includes a storage unit, an identification unit, a touchscreen unit and a processing unit, the storage unit storing a plurality of user data, and each of the user data corresponding to one of inactive area setting data. The method according to the present invention includes: generating feature data by the identification unit on the basis of a specific user; presenting an operation interface by the touchscreen unit, the operation interface providing a plurality of function keys, and each function key corresponding to a display area and a function; and comparing the feature data with the user data by the processing unit, to obtain the inactive area setting data corresponding to the feature data, so as to set at least one touch inactive area on the touchscreen unit. In the plurality of function keys, when a function key corresponding to a display area overlapped with the touch inactive area is touched on the touchscreen unit, a corresponding function will not be activated.

The present invention further discloses a non-transitory recording medium, which stores a computer program and is applicable to a touch device, so as to execute a method for dynamically setting a touch inactive area when the computer program is executed by the touch device. The touch device includes a storage unit, an identification unit, a touchscreen unit and a processing unit, the storage unit storing a plurality of user data, and each of the user data corresponding to one of inactive area setting data. The executed method includes: generating feature data by the identification unit on the basis of a specific user; presenting an operation interface by the touchscreen unit, the operation interface providing a plurality of function keys, and each function key corresponding to a display area and a function; and comparing the feature data with the user data by the processing unit, to obtain the inactive area setting data corresponding to the feature data, so as to set at least one touch inactive area on the touchscreen unit. In the plurality of function keys, when a function key corresponding to a display area overlapped with the touch inactive area is touched on the touchscreen unit, a corresponding function will not be activated.

In the touch device and method for dynamically setting a touch inactive area, and the non-transitory recording medium according to the present invention, a touch inactive area is set in an operation interface, the touch inactive area may be dynamically configured on the basis of holding habits of different users, i.e., the touch inactive area may be set on the basis of positions where hands or other parts of different users habitually touch the interface, and thus required touch inactive areas can be provided with respect to each user, to enable each user to avoid the situation of starting a program due to unwanted touch or reducing occurrence of such events, reduce the time that the user operates the interface, and increase the work efficiency. Secondly, in the situation that the touch device cooperates with any working system to operate, decrease or reduction of unwanted touch events may reduce or avoid that the touch device provides mistaken working information, and may also avoid that the working system stores mistaken data, or further generates or starts a mistaken operating mechanism, which is conducive to avoiding or reducing loss of property and cost of manpower and error correction. Thirdly, by identifying characteristics of users, the device must dynamically set corresponding touch inactive areas on the basis of habits of different users, which can enhance applicability of the device.

DETAILED DESCRIPTION

Preferred embodiments of the present invention are further described in detail below with reference to the accompanying drawings.

Figure 1:
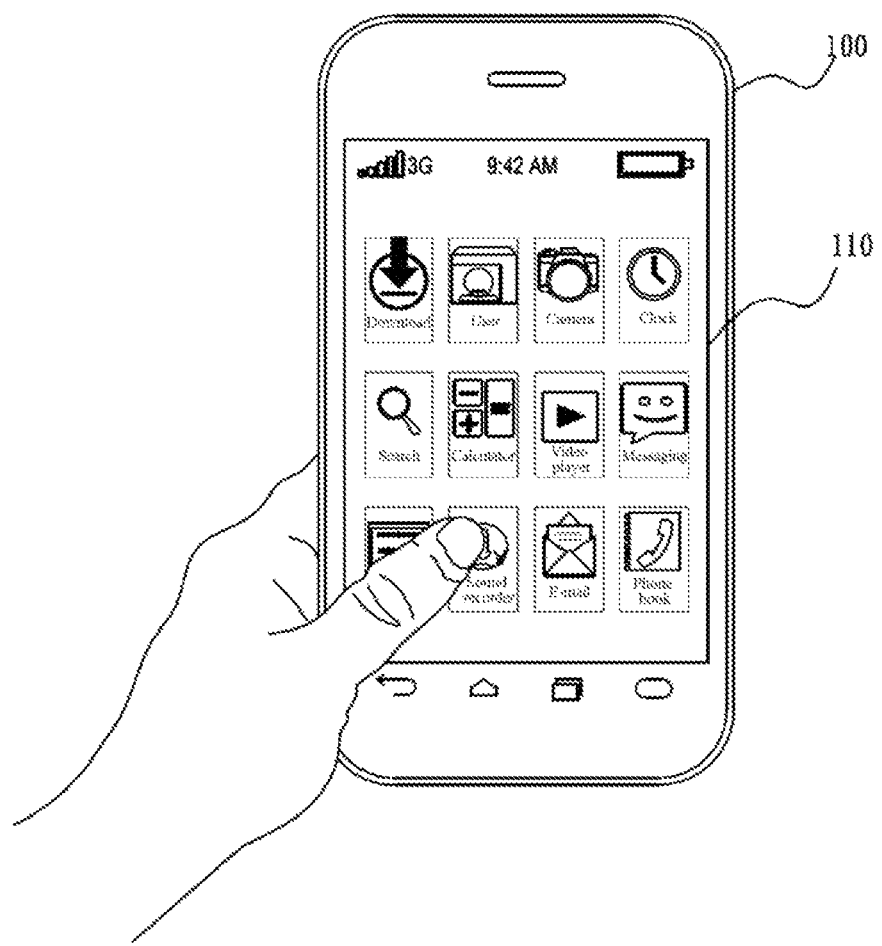
FIG. 1 is a diagram of unwanted touch on an interface of a touch device in the prior art.
Figure 2A:
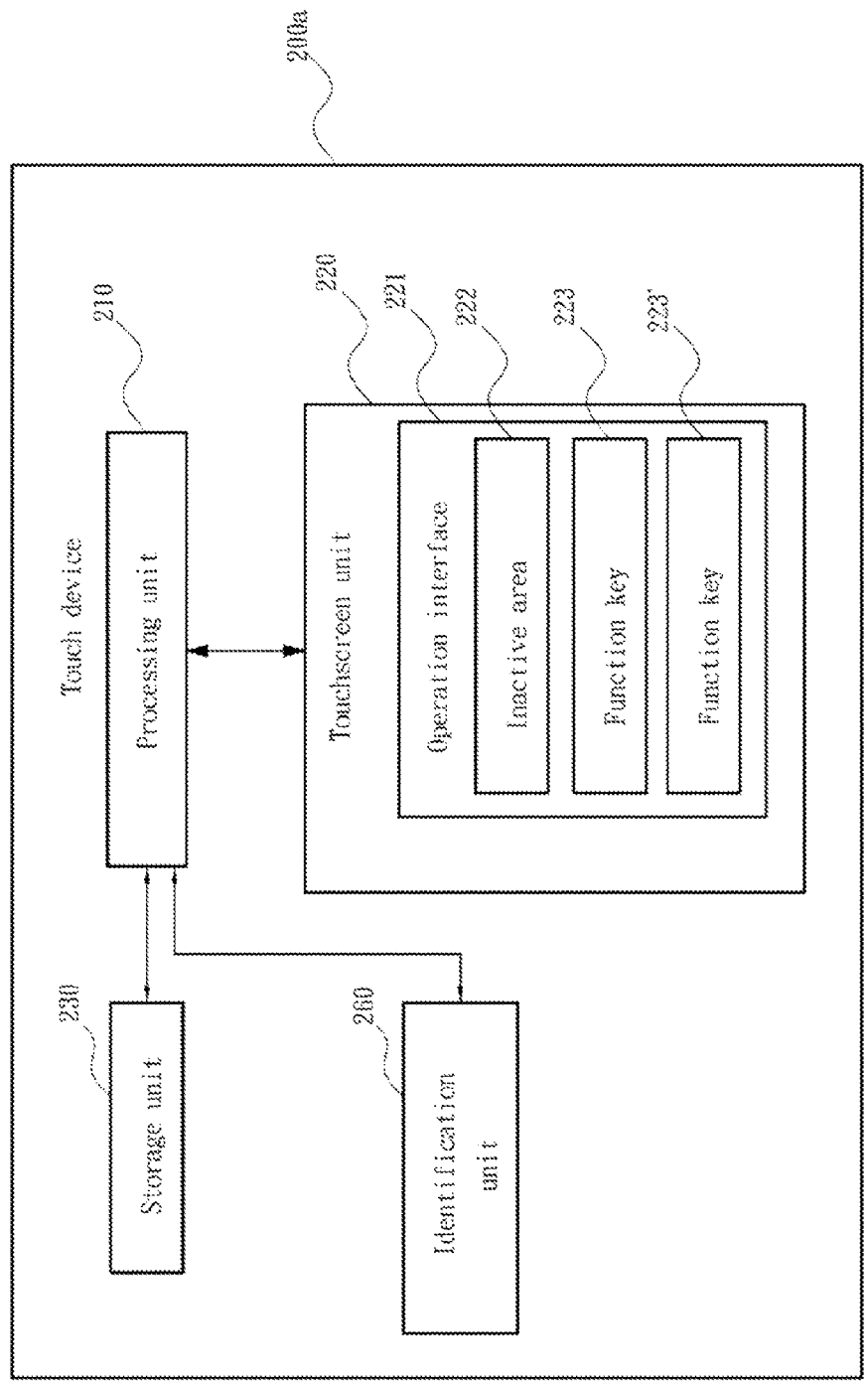
FIG. 2A is a block diagram illustrating the device architecture of an embodiment of a touch device for dynamically setting a touch inactive area according to the present invention.
Figure 2B:
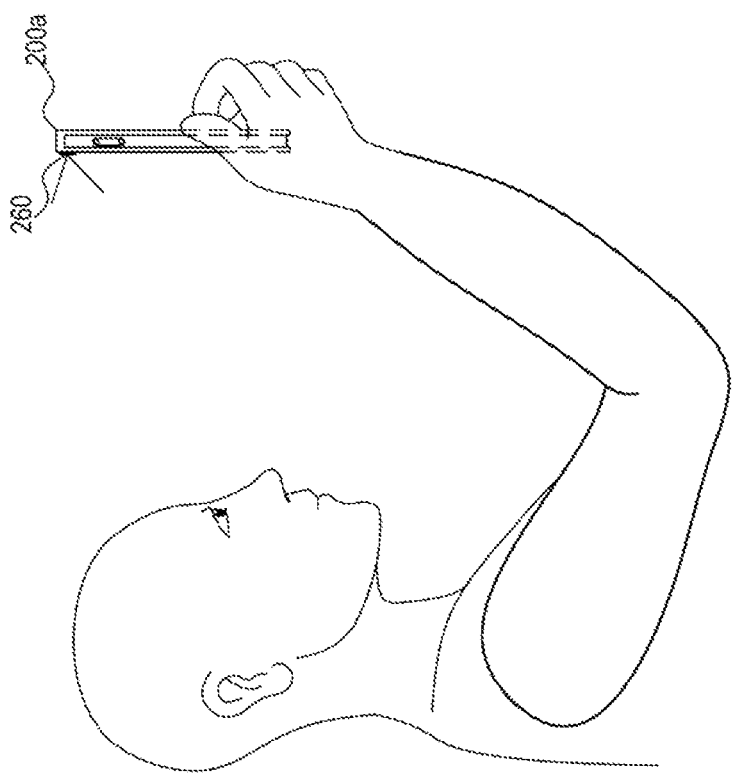
FIG. 2B is a diagram illustrating a user operating the touch device in the embodiment of the touch device for dynamically setting a touch inactive area according to the present invention.

FIG. 2A is a block diagram illustrating device architecture of an embodiment of a touch device for dynamically setting a touch inactive area according to the present invention, and FIG. 2B is a diagram illustrating a user operating the touch device in the embodiment of the touch device for dynamically setting a touch inactive area according to the present invention. In this embodiment, the touch device temporarily uses a portable device having touchscreen capability for displaying, such as a touch phone (smart phone), a personal digital assistant (PDA), a touch navigation device, or a tablet PC, but the present invention is not limited thereto, as long as it is a touch device.

The touch device 200a mainly includes: a storage unit 230, an identification unit 260, a touchscreen unit 220 and a processing unit 210, the storage unit 230, the identification unit 260 and the touchscreen unit 220 being respectively electrically connected with the processing unit 210.

Figure 4:
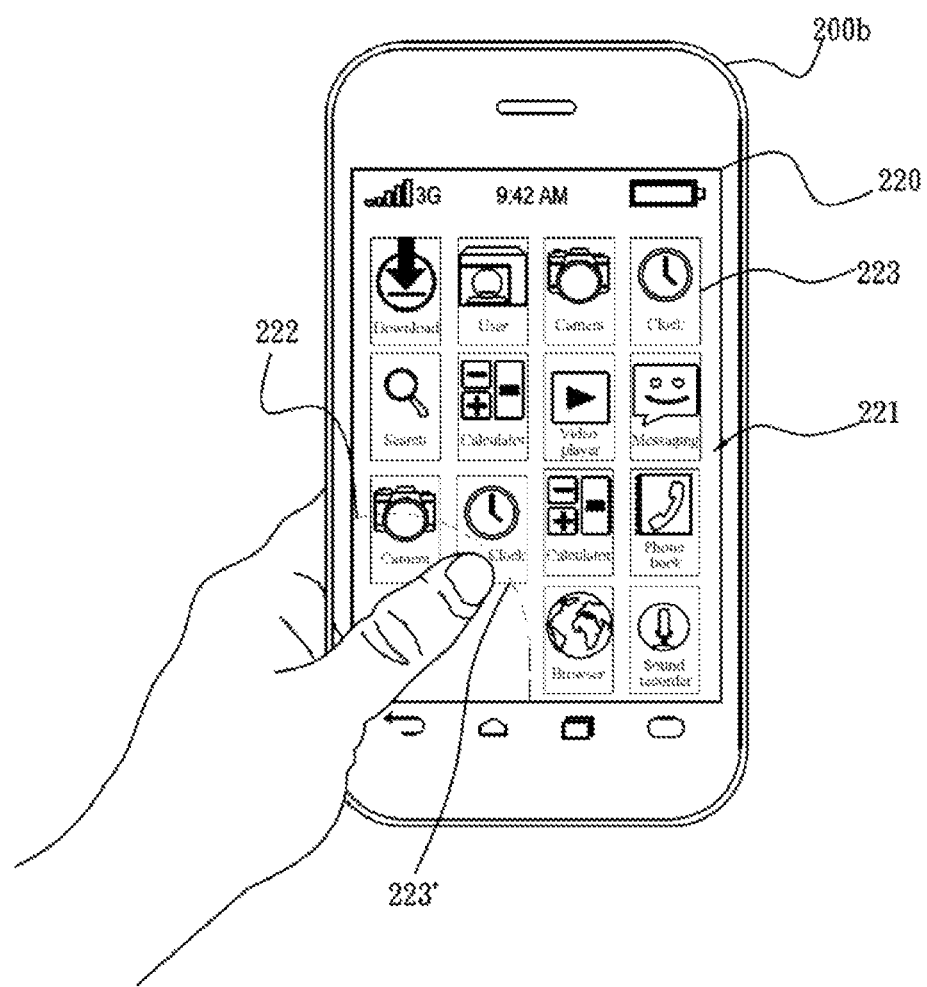
FIG. 4 to FIG. 6 are diagrams of configuration of a specially-shaped inactive area of the embodiment of the touch device according to the present invention.

The touchscreen unit 220 is a displayer having display and touch functions, which may be a generally commercially available touch device, for example, a touchscreen. The touchscreen unit 220 is used for presenting an operation interface 221. The operation interface 221 provides a plurality of function keys 223 (as shown in FIG. 4), each function key (223, 223') corresponding to a display area and a function.

The processing unit 210 includes various processors having data computing function (for example, a central processing unit, a micro processing unit, or a micro computing unit), computing chips or any combined circuit of the foregoing elements, and combinations of other elements of relevant functions and types such as an integrated circuit (IC) and an electronic component having equivalent capacity are also applicable, which are not limited herein. In other embodiments, the processing unit 210 may also be replaced by a general electronic apparatus, such as a computer, a mobile device, or a PDA.

The storage unit 230 is used for storing a plurality of user data, for the processing unit 210 to identify identities of users, and the user data may be, for example, user account, password, name, or feature data of physical appearance, like a facial image, fingerprint, or sound. Each of the user data corresponds to one of inactive area setting data, which is used for respectively setting inactive areas when each user operates on a touch screen, and may be a setting position, a range, touch event management, or other related operation settings of a touch inactive area.

The identification unit 260 may be integrated on the touch device 200a, and may also be linked to the touch device 200a via network communication, so as to identify a specific user and generate corresponding feature data. The identification unit 260, the feature data and the user data may have different presentation manners according to demands of designers. For example, when the user data is identity data of the user, the identification unit may be a software operation input interface, and the feature data is the identity data inputted by the specific user through the operation input interface.

Referring to FIG. 2B, in some embodiments, the user data is appearance images, facial images, or appearance feature data of users. The identification unit 260 is an image-capturing unit (camera or video camera), and the feature data is an image of the specific user captured by the image-capturing unit.

The processing unit 210 connects to the storage unit 230 and the identification unit 260. The processing unit 210 may obtain feature data, and compare the feature data with the user data stored by the storage unit 230, to obtain the inactive area setting data corresponding to the feature data, so as to set at least one touch inactive area 222 on the touchscreen unit 220. In the touch inactive area 222, function keys of a system interface or an application interface may not be activated when being touched by a user, that is, if a display area corresponding to the function key 223' is overlapped with the touch inactive area, when the function key 223' is touched on the touchscreen unit, the processing unit 210 may not activate a function corresponding to the function key 223'. Alternatively, in the touch inactive area 222, when an input area of the system interface or application interface is touched by a user, an input signal may not be generated.

In some embodiments, when a user clicks or touches the range of the operation interface 221, the touchscreen unit 220 may generate change of voltage or electrostatic field, to obtain touch position data. The touch position data may be transmitted by the touchscreen unit 220 to the processing unit 210.

The processing unit 210 may obtain the position data, and compares the position data with the touch inactive area 222. When the processing unit 210 determines that the position data is located at the touch inactive area 222, that is, the touch position is consistent with the inactive area setting data corresponding to the user data, the processing unit 210 does not execute an operation instruction corresponding to the touch position. The operation instruction may be presentation, execution and computation of an execution program, data input/output, touch events and any other data, and even if the position data matches a display range of the function key 223', the processing unit 210 may not activate a function corresponding to the function key 223'. In another embodiment, the processing unit 210 can directly neglect or does not process the position data provided by the touchscreen unit 220 when the touch position falls in the range of the touch inactive area 222. In a further embodiment, the processing unit 210 may also firstly execute an operation instruction before not executing an operation instruction corresponding to the touch position, for example, generate a confirm function key on the touchscreen unit 220. If a user touches the confirm function key, it indicates that the user still intends to start the function corresponding to the function key 223', and the processing unit 210 executes the function corresponding to the function key 223' or releases the touch inactive area 222; while if the user does not touch the confirm function key within a certain period of time (e.g., 3 seconds), the processing unit 210 does not execute the operation instruction corresponding to the touch position, and cancels the confirm function key on the touchscreen unit 220.

However, range data of the touch inactive area 222 may also be recorded in (1) an operating program of the operation interface 221, and the processing unit 210 may be used when the operation interface 221 is presented; and (2) user login data of a working system, and when a user logs in to the working system through the touch device 200, the processing unit 210 reads and uses the user login data. In addition to the above, the range data of the touch inactive area 222 can be stored in any data recording manner, which is not limited herein.

In other embodiments, when the operation interface 221 presents one or more specific program diagrams or function keys 223, and the processing unit 210 determines that there are program diagrams or function keys 223' located in the touch inactive area 222, the processing unit 210 can further automatically adjust the positions of the program diagrams or function keys 223', to make the specific program diagrams or function keys 223' displayed in a range beyond the touch inactive area 222.

Figure 3:
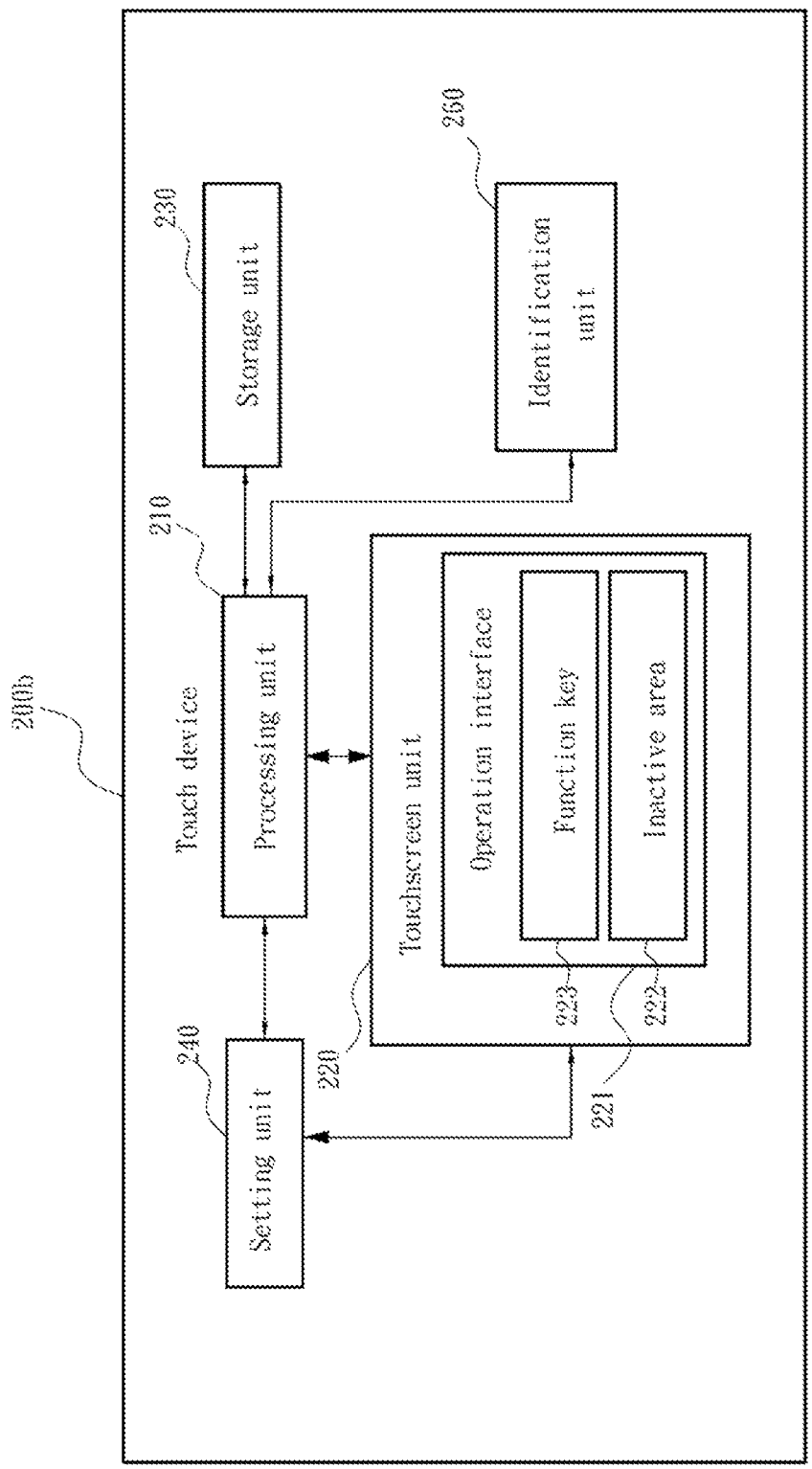
FIG. 3 is a block diagram illustrating device architecture of another embodiment of the touch device according to the present invention.
Figure 5:
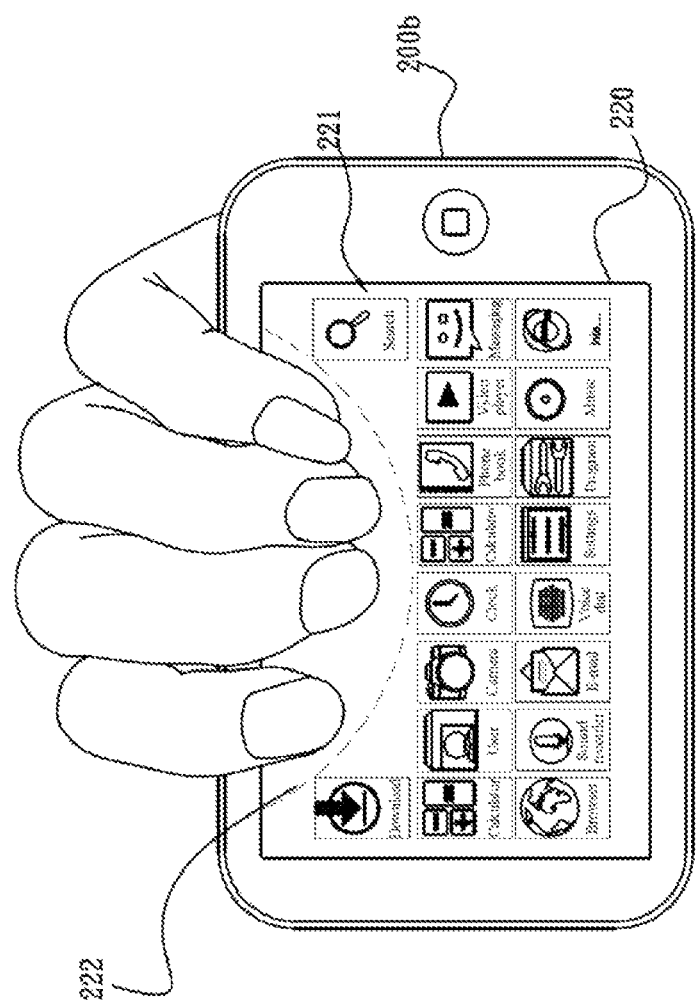
Figure 6:
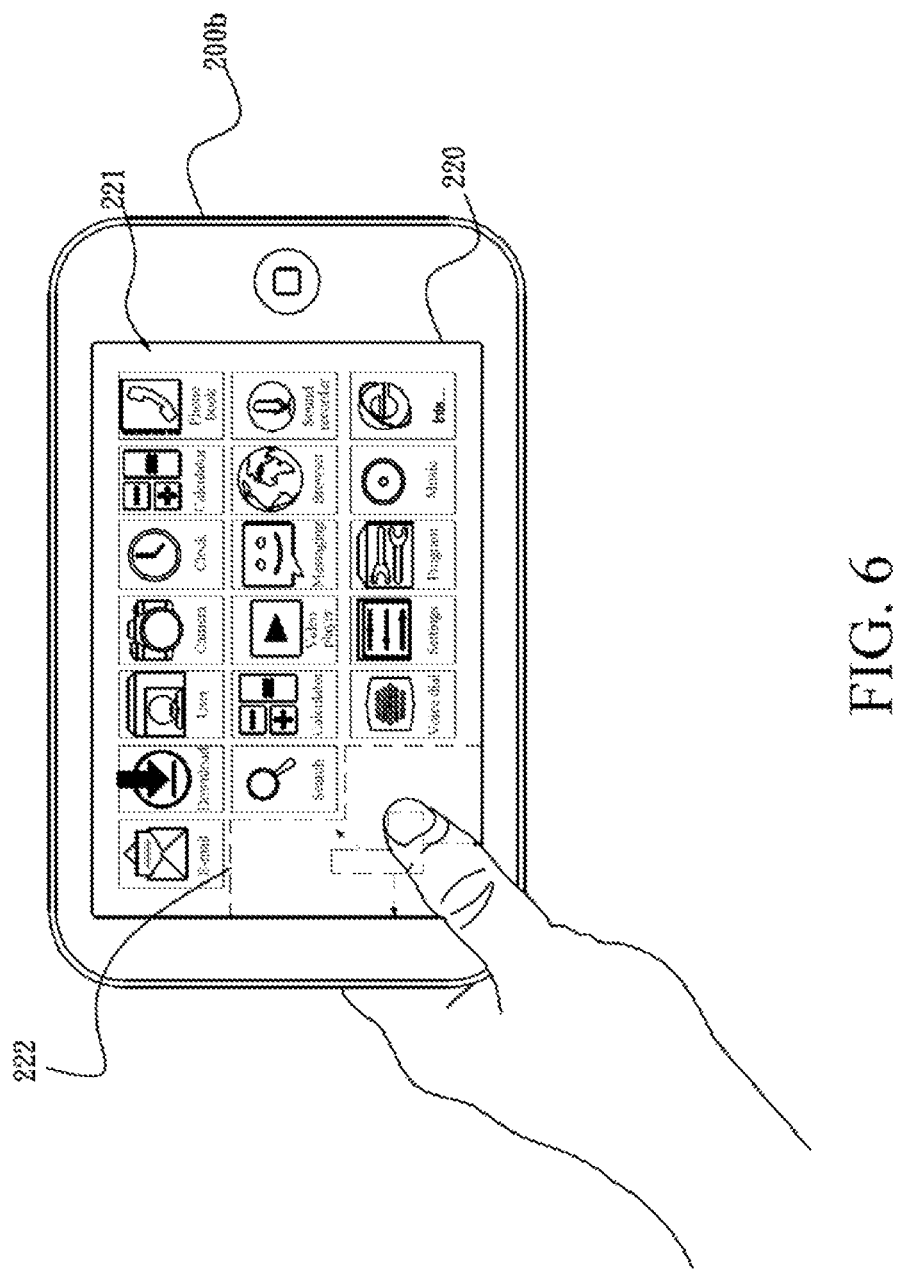
Figure 7:
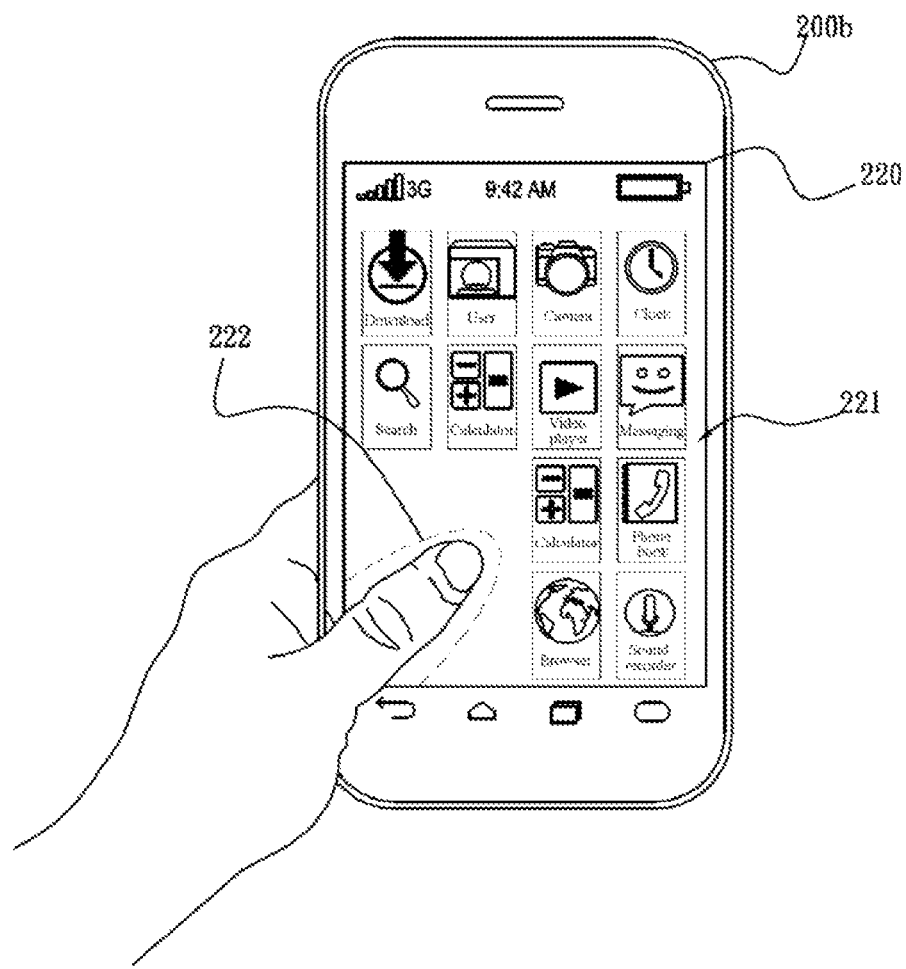
FIG. 7 to FIG. 8 are diagrams of configuration of a non-specially-shaped inactive area of the embodiment of the touch device according to the present invention.
Figure 8:
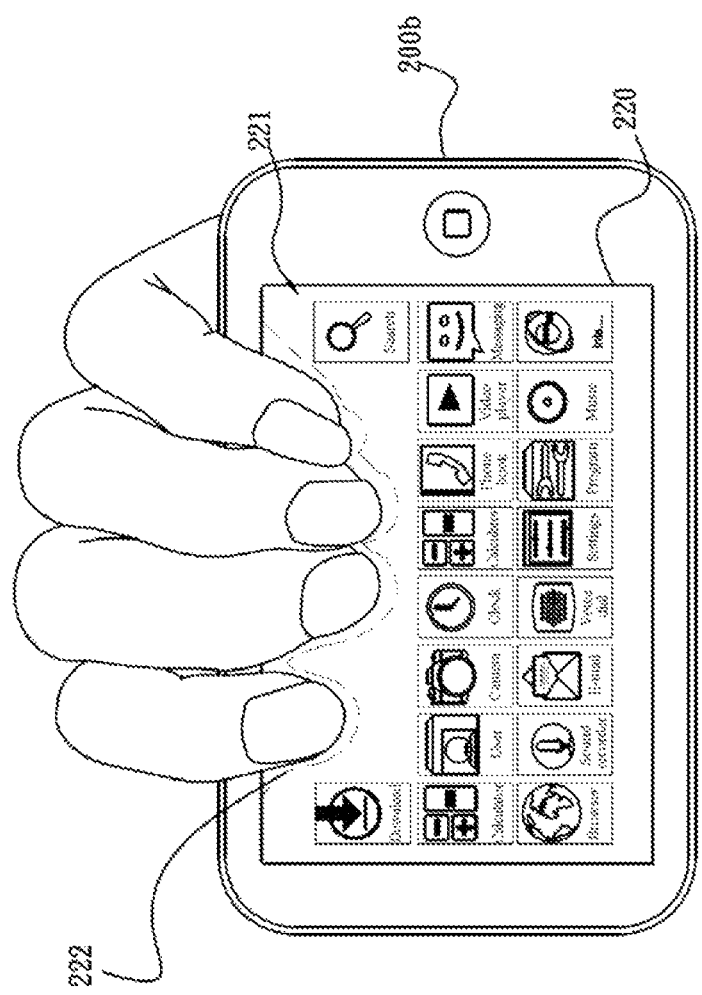

FIG. 3 is a block diagram illustrating device architecture of another embodiment of the touch device according to the present invention, FIG. 4 to FIG. 6 are diagrams of configuration of a specially-shaped inactive area of the embodiment of the touch device according to the present invention, and FIG. 7 to FIG. 8 are diagrams of configuration of a non-specially-shaped inactive area of the embodiment of the touch device according to the present invention.

Different from the foregoing embodiments, a touch device 200b may further include a setting unit 240, and when the storage unit 230 does not have user data or intends to add user data of a user, the setting unit 240 can be used for setting a range of the touch inactive area 222 corresponding to each of user data.

The setting unit 240 performs setting in at least the following manners:

(1) The setting unit 240 may establish in advance and provide a plurality of range graphics for the user to select, and place or move a selected range graphic to a position selected by the user. The range graphic may be a specific shape such as square, circular, L-shaped, or polygonal. In other embodiments, the setting unit 240 may adjust the shape of the range graphic according to whether the position where the range graphic is configured is located on a border of the operation interface 221. Alternatively, the setting unit 240 may allow the user to set the range of the touch inactive area 222, and directly draw lines on the touchscreen unit 220 to form non-specific shapes, for example, the user depicts through a touch track and/or a border of the operation interface 221 to define the range of the touch inactive area 222 on the touchscreen unit 220.

Referring to FIG. 4, assume that the range graphic selected by the user is circular, but the position selected by the user is the lower left corner of the operation interface 221 and has exceeded the border of the operation interface 221, therefore the setting unit 240 adjusts the shape of the range graphic to be appropriately "fan-shaped."

Referring to FIG. 5, assume that the range graphic selected by the user is elliptical, but the position selected by the user is above the operation interface 221 and has exceeded the border of the operation interface 221, the setting unit 240 adjusts the shape of the range graphic to be appropriately "semi-elliptical."

Referring to FIG. 6, assume that the range graphic selected by the user is L-shaped, but the position selected by the user is the lower left corner of the operation interface 221 and does not exceed the border of the operation interface 221, the setting unit 240 expands the configured range moderately, and the expansion may be set by the user or by a program execution rule of the setting unit 240.

(2) The setting unit 240 may, respectively on the basis of operation habits of each user, automatically set inactive area setting data corresponding to each user. For example, when the storage unit 230 has user data but does not have inactive area setting data, the setting unit 240 may be started first to perform setting of the touch inactive area 222, the user can use the touch device 220b according to operation habits, and the touchscreen unit 220 may output touch position data and a touch area of the operation interface 221 to the setting unit 240. The setting unit 240, after obtaining the touch area, determines whether the touch area exceeds a range threshold. If the touch area exceeds the range threshold, the setting unit 240 generates inactive area setting data corresponding to the user on the basis of the touch area, i.e., the touch area is set to be the touch inactive area 222, and it is also feasible to combine multiple touch areas exceeding the range threshold to generate the touch inactive area 222. The range threshold may be a maximum touch area generated when the user makes a single touch to the touchscreen unit 220 by means of a finger or a touch tool, or an average value of multiple single-touch areas plus a range of reasonable error values, or the maximum touch area plus the range of reasonable error values. The touch area, the range threshold, the reasonable error values, and so on may be area values of the touch or values of peripheral sides.

For example, when a user intends to execute a function key, a finger or touch pen clicks the touchscreen unit 220, causing a touch area which is not too large, e.g., 1 square centimeter, and when the touch area is greater than 1 square centimeter, it is most likely to cause unwanted touch. Thus, designers of the device and software may set the range threshold to be greater than an area value generated with one finger contacting the touchscreen unit 220. Afterwards, the setting unit 240 judges whether the area value generated by each touch/click exceeds the range threshold, and accordingly determines whether the touch/click is unwanted touch, and if yes, the position and the range of the unwanted touch may be set as the touch inactive area 222. Further, the setting unit 240 may integrate multiple preset touch inactive areas into one touch inactive area, for example, recombine borders of multiple touch inactive areas that are overlapped with each other or multiple touch inactive areas whose border distances are close to each other (e.g., within 1 centimeter) to generate a new touch inactive area, which is used to replace the original multiple touch inactive areas.

In other embodiments, a time threshold may be added to the judgment of the setting unit 240. Only when the setting unit 240 determines that the touch area is greater than the range threshold and the touch area is continuously touched with the touch duration exceeding the time threshold, the setting unit 240 sets the touch area to be the touch inactive area 222.

(3) The setting unit 240 may record the number of the operation interface 221 is immediately closed after being touched and started by each user within a time range, so as to set the inactive area setting data corresponding to each user. Generally, the situation that the user starts a function and then immediately closes is often generated by unwanted touch of the user. Hence, the setting unit 240 generates the inactive area setting data according to a touch position where each specific user touches the touchscreen unit 220 and an execution program state of the processing unit 210. That is to say, the setting unit 240 records corresponding touch positions when the number of the operation interface 221 is immediately closed after being touched and started by each user within a time range exceeds the number of unwanted touch (which is determined by the users or designers upon demands), and generates the inactive area setting data corresponding to each specific user on the basis of the touch position of at least one recorded the touch range.

In some embodiments, the setting unit 240 generates the inactive area setting data on the basis of the touch position where each user touches the touchscreen unit 220 and the execution program state of the processing unit 210, which means recording a touch position of each user when the touch by each user of the operation interface 221 within a time range does not fall in a touch area of an function key 223 of the operation interface 221, and generating the inactive area setting data corresponding to each user on the basis of at least one recorded touch position.

Referring to FIG. 7, the lower left corner of the operation interface 221 of the touchscreen unit 220 is mostly contacted by the thumb of the user, and the setting unit 240 sets that the touch inactive area 222 has an equivalent range or a slightly larger shape, which is similar to the touch area of the thumb.

Referring to FIG. 8, the lower left corner of the operation interface 221 of the touchscreen unit 220 is contacted by several fingers of the user, and the setting unit 240 sets that the touch inactive area 222 has an equivalent range or a slightly larger shape, which is similar to the touch area of the fingers.

However, in the case that the touch inactive area 222 already exists, the setting unit 240 may determine, on the basis of demands of the designer or operation of the user, whether to dynamically adjust the range of the touch inactive area 222 in the general use state of the operation interface 221. When the setting unit 240 is set to dynamically adjust the touch inactive area 222, whether to adjust the touch inactive area 222 can be determined on the basis of the touch position where the user continuously touches the operation interface 221 and the touch area thereof, which may be implemented as following:

(1) The setting unit 240 compares the inactive area setting data corresponding to the specific user with the touch position where the specific user touches the operation interface 221 and the touch area thereof, and when it is determined that the corresponding touch area exceeds the range threshold and touch duration exceeds a time threshold, determines whether the touch position is consistent with the inactive area setting data corresponding to the specific user; and if it is determined that they are inconsistent, that is, the touch position does not fall in the range of the touch inactive area 222, the setting unit 240 may regenerate the inactive area setting data corresponding to the specific user on the basis of the touch position and the touch area of the specific user. The setting unit 240 is further used for, when a data difference between the corresponding touch position and the inactive area setting data corresponding to the specific user satisfies a range offset condition, determining that the corresponding touch position is inconsistent with the inactive area setting data corresponding to the specific user, and regenerating the inactive area setting data corresponding to the specific user on the basis of the corresponding touch position and touch area. (2) The setting unit 240 may further determine, on the basis of the touch position of the specific user on the operation interface 221 and the inactive area setting data corresponding thereto, whether the data difference between the touch position and the inactive area setting data corresponding to the specific user satisfies a range offset condition. The range offset condition is, for example, a distance between the touch position of the operation interface 221 and the border (or center) of the touch inactive area 222 exceeding a specified value, and the setting unit 240 resets, on the basis of the touch position and the touch area of the operation interface 221, the inactive area setting data of the specific user, that is, the range of the touch inactive area 222 is reset.

Figure 9:
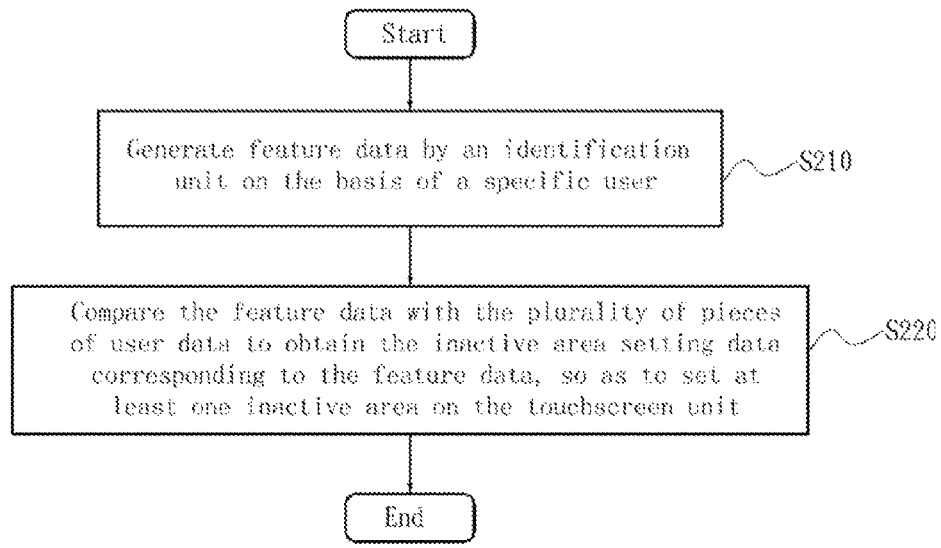
FIG. 9 is a flow chart of dynamically setting an inactive area according to an embodiment of the present invention.

FIG. 9 is a flow chart of a method for dynamically setting an inactive area according to an embodiment of the present invention; and reference can also be made to FIG. 2A for easy understanding. The method according to the present invention is applied to a touch device 200a, and the touch device 200a may include a storage unit 230, an identification unit 260, a touchscreen unit 220 and a processing unit 210, the storage unit 230 storing a plurality of user data, and each of user data corresponding to one of inactive area setting data. The process is described as following:

The identification unit 260 generates feature data on the basis of a specific user (step S210). The processing unit 210 compares the feature data with the plurality of user data to obtain the inactive area setting data corresponding to the feature data, so as to set at least one touch inactive area 222 on the touchscreen unit 220 (step S220). The touchscreen unit 220 is used for presenting an operation interface 221 which provides a plurality of function keys (223, 223'), each function key (223, 223') corresponding to a display area and a function. When a function key 223' corresponding to a display area overlapped with the touch inactive area 222 is touched on the touchscreen unit 220, the processing unit 210 may not activate a function corresponding to the function key 223'. The identification unit 260, the feature data and the user data are presented in different manners upon demands of the designer. For example, when the user data is identity data of the user, the identification unit may be a software operation input interface, and the feature data is the identity data input by the specific user through the operation input interface. For another example, the user data is appearance images, facial images, or appearance feature data of users, the identification unit 260 is an image-capturing unit (camera or video camera), and the feature data is an image of the specific user captured by the image-capturing unit.

In some embodiments, when the processing unit 210 determines that touch position data of the operation interface 221 is consistent with range data of the touch inactive area 222, the processing unit 210 does not execute an operation instruction corresponding to the touch position, or neglects the position data provided by the touchscreen unit 220. In another embodiment, the processing unit 210 may also firstly execute a corresponding operation instruction on the basis of touch event management, for example, generate a confirm function key on the touchscreen unit 220. If the user touches the confirm function key, it indicates that the user intends to activate the function corresponding to the function key 223', and the processing unit 210 executes the function corresponding to the function key 223' or releases the touch inactive area 222; while if the user does not touch the confirm function key within a certain period of time (e.g., 3 seconds), the processing unit 210 cancels the confirm function key on the touchscreen unit.

Figure 10:
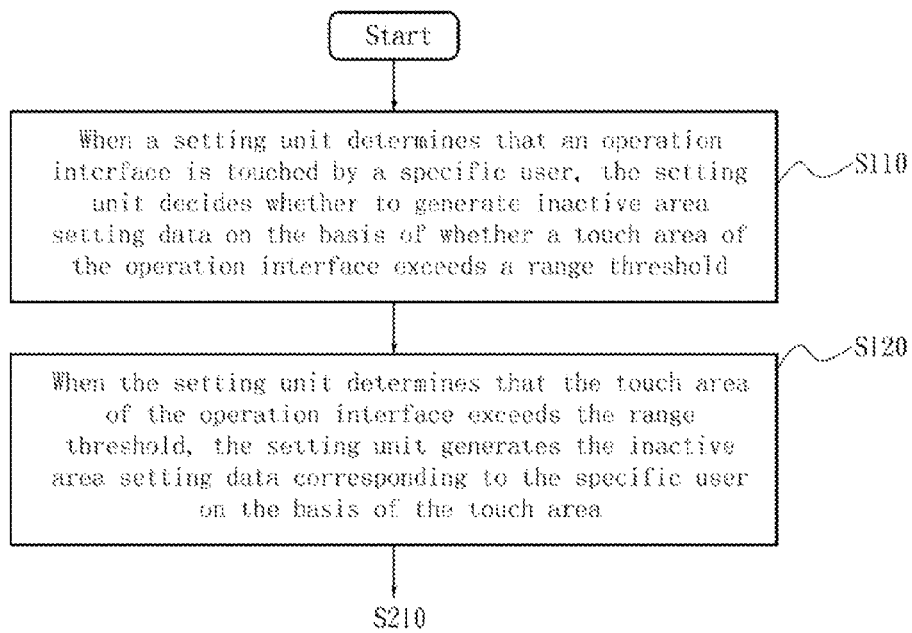
FIG. 10 is a flow chart of setting a first inactive area according to an embodiment of the present invention.

FIG. 10 is a flow chart of setting a first inactive area according to an embodiment of the present invention; and reference can also be made to FIG. 3 for easy understanding. The process of setting the inactive area may be performed before step S210, and the process is described as following:

When determining that the operation interface 221 is touched by a specific user, the setting unit 240 determines whether to generate inactive area setting data on the basis of whether the touch area of the operation interface 221 exceeds a range threshold (step S110). The touchscreen unit 220 may output touch position data of the operation interface 221 to the setting unit 240. The setting unit 240 determines, after obtaining the touch position data, that the operation interface 221 is being touched. Then, the setting unit 240 may compare whether the touch area of the operation interface 221 exceeds the range threshold. The range threshold may be a maximum touch area generated when the user makes a single touch to the touchscreen unit 220 by means of a finger or a touch tool, or an average value of multiple single-touch areas plus a range of reasonable error values, or the maximum touch area plus the range of reasonable error values. The touch area, the range threshold, the reasonable error values, and so on may be area values of the touch or values of peripheral sides.

When determining that the touch area of the operation interface 221 exceeds the range threshold, the setting unit 240 generates the inactive area setting data corresponding to the specific user on the basis of the touch area (step S120).

Figure 11:
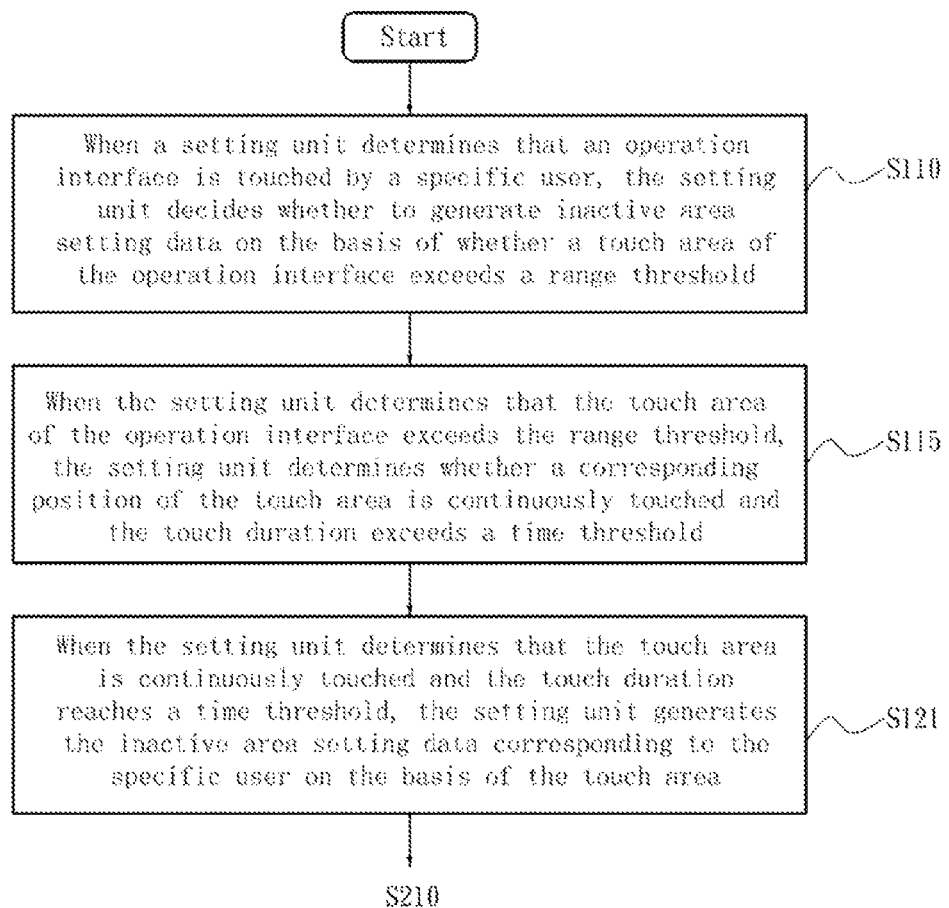
FIG. 11 is a flow chart of setting a second inactive area according to an embodiment of the present invention.

FIG. 11 is a flow chart of setting a second inactive area according to an embodiment of the present invention. The difference of the process illustrated in FIG. 10 lies in that the setting unit 240 may further determine whether the operation interface 221 is continuously touched and the touch duration exceeds a time threshold when it is determined that the touch area of the operation interface 221 exceeds the range threshold (step S115).

When the two conditions in step S110 and step S115 are both satisfied, the setting unit 240 generates the inactive area setting data corresponding to the specific user on the basis of the touch area (step S121).

Figure 12:
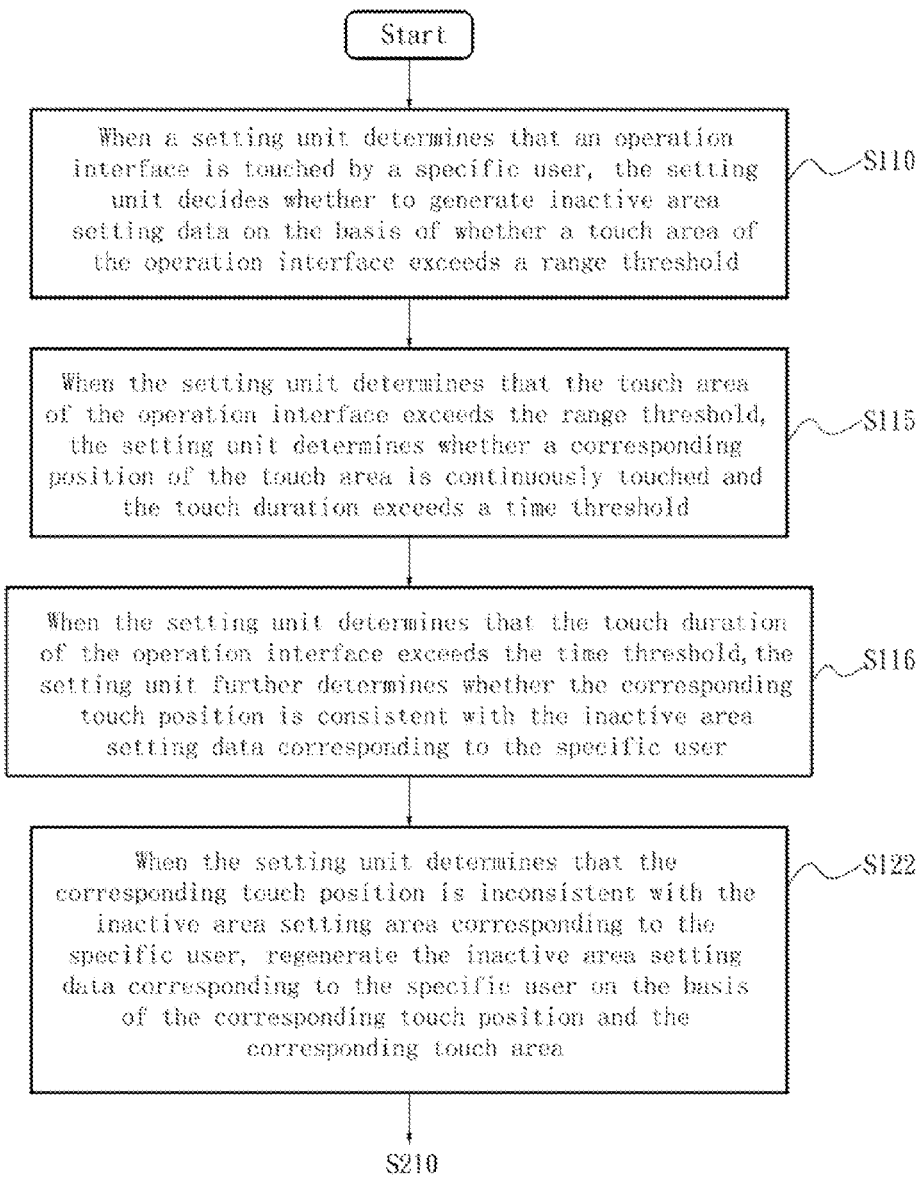
FIG. 12 is a flow chart of setting a third inactive area according to an embodiment of the present invention.

FIG. 12 is a flow chart of setting a third inactive area according to an embodiment of the present invention. The difference of FIG. 10 and FIG. 11 lies in that the setting unit 240 may further determine whether the corresponding touch position is consistent with the inactive area setting data corresponding to the specific user when it is determined that the touch duration of the operation interface 221 exceeds the range threshold (step S116), and when they are inconsistent, regenerate the inactive area setting data corresponding to the specific user on the basis of the corresponding touch position and the corresponding touch area (step S122).

Figure 13:
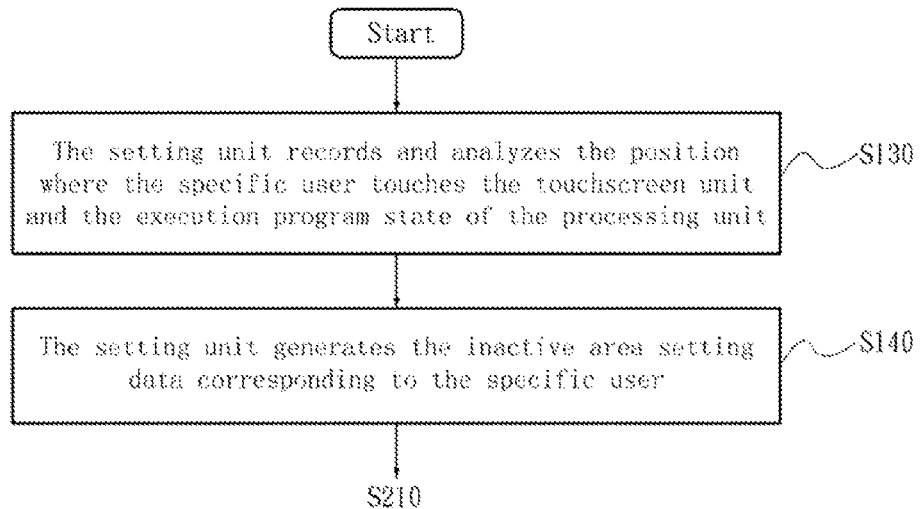
FIG. 13 is a flow chart of setting a fourth inactive area according to an embodiment of the present invention.

FIG. 13 is a flow chart of setting a fourth inactive area according to an embodiment of the present invention. The process is described as following:

The setting unit 240 records and analyzes the position where the specific user touches the touchscreen unit 220 and the execution program state of the processing unit 210 (step S130), to generate the inactive area setting data corresponding to the specific user (step S140).

For example, when it is determined that the number of the operation interface 221 is immediately closed after being touched and activated by the specific user within a time range exceeds the number of unwanted touch, the setting unit 240 records corresponding touch positions and generates the inactive area setting data corresponding to the specific user on the basis of at least one recorded touch position.

Alternatively, when detecting that the touch position of the specific user does not fall in the touch area of the function key 223 of the operation interface 221 within a time range, the setting unit 240 records the touch position of the specific user, and generates the inactive area setting data corresponding to the specific user on the basis of at least one recorded touch position.

Figure 14:
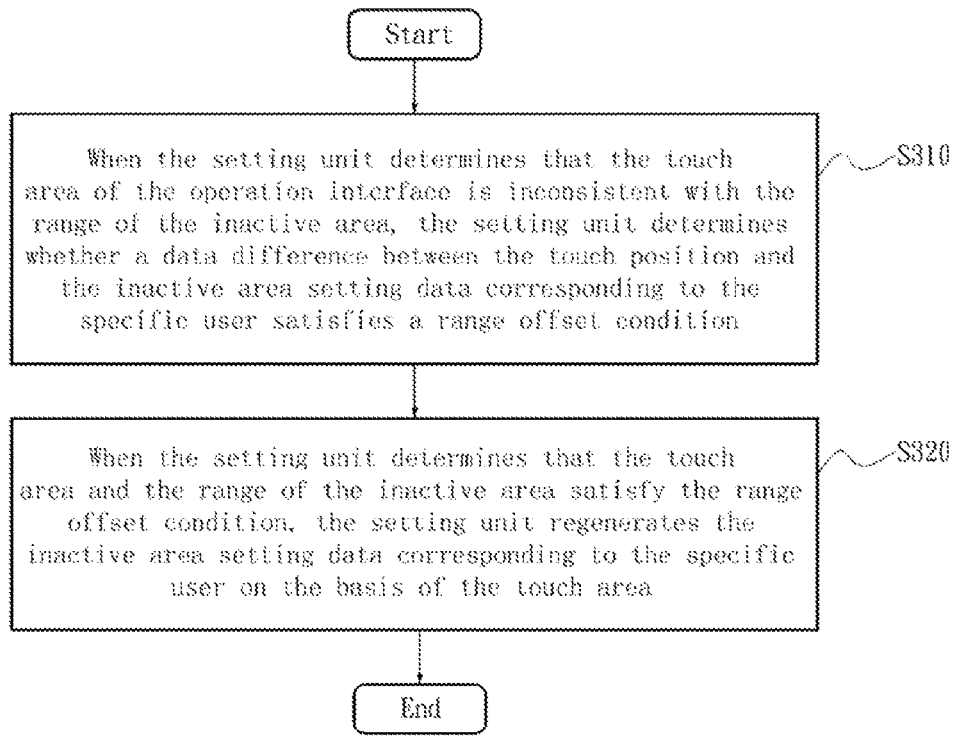
FIG. 14 is a flow chart of dynamically setting an inactive area according to an embodiment of the present invention.

FIG. 14 is a flow chart of dynamically setting an inactive area according to an embodiment of the present invention; and reference can also be made to FIG. 4 for easy understanding. The method is executed after any process illustrated in FIG. 10 to FIG. 13, and may also be implemented synchronous with or after the process illustrated in FIG. 9. The process is described as following:

When determining that the touch position of the operation interface 221 is inconsistent with the range of the touch inactive area 222, the setting unit 240 determines whether a data difference between the touch position and the inactive area setting data corresponding to the specific user satisfies a range offset condition (step S310).

When determining that the touch position and the range of the touch inactive area 222 satisfy the range offset condition, the setting unit 240 regenerates the inactive area setting data corresponding to the specific user on the basis of the touch area (step S320).

However, in the above step S310 and step S320, when determining that the touch position of the operation interface 221 is inconsistent with the touch inactive area 222, the setting unit 240 may reset the range of the touch inactive area 222 on the basis of the touch position and the touch range of the operation interface 221.

The above merely describes implementation manners or embodiments of technical measures employed by the present invention for solving the problem, but it is not to limit the scope of implementation of the present invention. Equivalent variations and modifications consistent with the content of the claims of the present invention or made according to the scope of the present invention shall fall within the scope of the present invention.

What is claimed is:

1. A touch device for dynamically setting an inactive area, comprising:

a storage unit, used for storing a plurality of user data, and each of the user data is corresponding to a setting of the inactive area;

an identification unit, used for generating feature data on the basis of a specific user;

a touchscreen unit, used for presenting an operation interface, and the operation interface provides a plurality of function keys, and each of the function keys is corresponding to a display area and a function; and a processing unit, used for comparing the feature data with the user data to obtain the setting of the inactive area corresponding to the feature data, so as to set at least one touch inactive areas on the touchscreen unit, wherein, when one of the display areas corresponding to one of the function keys is in the touch inactive area and the function key is touched on the touchscreen unit, the function corresponding to the function key will not be activated.

2. The touch device according to claim 1, wherein each of the user data is the identification data corresponding to each of the users, and the identification unit is an input interface and the feature data is identity data of the specific user which is inputted through the input interface.

3. The touch device according to claim 1, wherein each of the user data is a profile image corresponding to each of the users, and the identification unit is an image-capturing unit and the feature data is an image of the specific user captured by the image-capturing unit.

4. The touch device according to claim 1, further comprising a setting unit, used for setting inactive area setting data corresponding to each of the user data.

5. The touch device according to claim 4, wherein the inactive area setting data corresponding to each of the users is generated when the setting unit determines that a touch area touched by each of the users through the operation interface exceeds a range threshold.

6. The touch device according to claim 5, wherein the inactive area setting data corresponding to each of the users is generated by the setting unit when the touch area touched by each of the users exceeds the range threshold and a touch duration exceeds a time threshold.

7. The touch device according to claim 5, wherein the operation interface is used for being touched by the specific user to generate a corresponding touch position and a corresponding touch area, and when the setting unit determines that the corresponding touch area exceeds the threshold range and the touch duration exceeds the time threshold and determines that the corresponding touch position is inconsistent with the inactive area setting data corresponding to the specific user, regenerating the inactive area setting data corresponding to the specific user on the basis of the corresponding touch position and the corresponding touch area.

8. The touch device according to claim 7, wherein the setting unit is further used for, when a difference between the corresponding touch position and the inactive area setting data corresponding to the specific user satisfies a range offset condition, determining that the corresponding touch position is inconsistent with the inactive area setting data corresponding to the specific user, and regenerating the inactive area setting data corresponding to the specific user on the basis of the corresponding touch position and the corresponding touch area.

9. The touch device according to claim 4, wherein the inactive area setting data corresponding to each of the users is generated respectively on the basis of a touch position where each of the users touches the touchscreen unit and an execution program state of the processing unit.

10. The touch device according to claim 9, wherein generation of the inactive area setting data on the basis of a touch position where each of the users touches the touchscreen unit and an execution program state of the processing unit comprises: recording corresponding touch positions when the number of times that the operation interface is immediately closed after being touched and activated by each of the users within a time range exceeds the number of unwanted touch, and generating the inactive area setting data corresponding to each of the users on the basis of at least one recorded touch positions.

11. The touch device according to claim 9, wherein generation of the inactive area setting data on the basis of a touch position where each of the users touches the touchscreen unit and an execution program state of the processing unit comprises: recording a touch position of each of the users when the touch by each of the users of the operation interface within a time range does not fall in a touch area of an function key of the operation interface, and generating the inactive area setting data corresponding to each of the users on the basis of at least one recorded touch positions.

12. A touch display method for dynamically setting a touch inactive area, is used for a touch device, wherein the touch device comprises a storage unit, an identification unit, a touchscreen unit and a processing unit, the storage unit storing a plurality of user data and each of the user data corresponding to one of inactive area setting data, and the method comprises:

generating feature data by the identification unit on the basis of a specific user;

presenting an operation interface by the touchscreen unit, the operation interface provides a plurality of function keys, and each function key corresponding to a display area and a function; and comparing the feature data with the user data by the processing unit, to obtain the inactive area setting data corresponding to the feature data, so as to set at least one touch inactive areas on the touchscreen unit, wherein, in the plurality of function keys, when an function key corresponding to a display area overlapped with the touch inactive area touched on the touchscreen unit, a corresponding function will not be activated.

13. The touch display method for dynamically setting a touch inactive area according to claim 12, wherein the touch device further comprises a setting unit, and the method further comprises:

setting inactive area setting data corresponding to each of the user data by the setting unit.

14. The touch display method for dynamically setting a touch inactive area according to claim 13, wherein the inactive area setting data corresponding to each of the user data is generated when the setting unit determines that a touch area touched by each user of the operation interface exceeds a range threshold.

15. The touch display method for dynamically setting a touch inactive area according to claim 14, wherein the inactive area setting data corresponding to each of the users is generated by the setting unit on the basis that the touch area touched by each of the users exceeds the range threshold and touch duration exceeds a time threshold.

16. The touch display method for dynamically setting a touch inactive area according to claim 14, wherein the operation interface is used for being touched by the specific user to generate a corresponding touch position and a corresponding touch area, and when the setting unit determines that the corresponding touch area exceeds the range threshold and touch duration exceeds a time threshold, and determines that the corresponding touch position is inconsistent with the inactive area setting data corresponding to the specific user, the method further comprises: regenerating the inactive area setting data corresponding to the specific user on the basis of the corresponding touch position and the corresponding touch area.

17. The touch display method for dynamically setting a touch inactive area according to claim 13, wherein the inactive area setting data corresponding to each of the users is generated respectively on the basis of a touch position where each of the users touches the touchscreen unit and an execution program state of the processing unit.

18. The touch display method for dynamically setting a touch inactive area according to claim 17, wherein generation of the inactive area setting data on the basis of a touch position where each of the users touches the touchscreen unit and an execution program state of the processing unit comprises: recording corresponding touch positions when the number of the operation interface is immediately closed after being touched and activated by each of the users within a time range exceeds the number of unwanted touch, and generating the inactive area setting data corresponding to each of the users on the basis of at least one recorded touch positions.

19. The touch display method for dynamically setting a touch inactive area according to claim 17, wherein generation of the inactive area setting data on the basis of a touch position where each of the users touches the touchscreen unit and an execution program state of the processing unit comprises: recording a touch position of each of the users when the touch area touched by each of the users of the operation interface within a time range does not fall in a touch area of an function key of the operation interface, and generating the inactive area setting data corresponding to each of the users on the basis of at least one recorded touch positions.

20. A non-transitory recording medium, used for storing a computer program, and applied to a touch device, so as to execute a method for dynamically setting a touch inactive area when the computer program is executed by the touch device, wherein the touch device comprises a storage unit, an identification unit, a touchscreen unit and a processing unit, the storage unit storing a plurality of user data and each of user data corresponding to one of inactive area setting data, and the method comprises:

generating feature data by the identification unit on the basis of a specific user;

presenting an operation interface by the touchscreen unit, the operation interface providing a plurality of function keys, and each function key corresponding to a display area and a function; and comparing the feature data with the user data by the processing unit, to obtain the inactive area setting data corresponding to the feature data, so as to set at least one touch inactive area on the touchscreen unit, wherein, in the plurality of function keys, when an function key corresponding to a display area overlapped with the touch inactive area is touched on the touchscreen unit, a corresponding function will not be activated.

* * * * *